Oct. 11, 1927.
W. M. FULTON
PACKLESS VALVE
1,644,825
Filed March 31, 1922
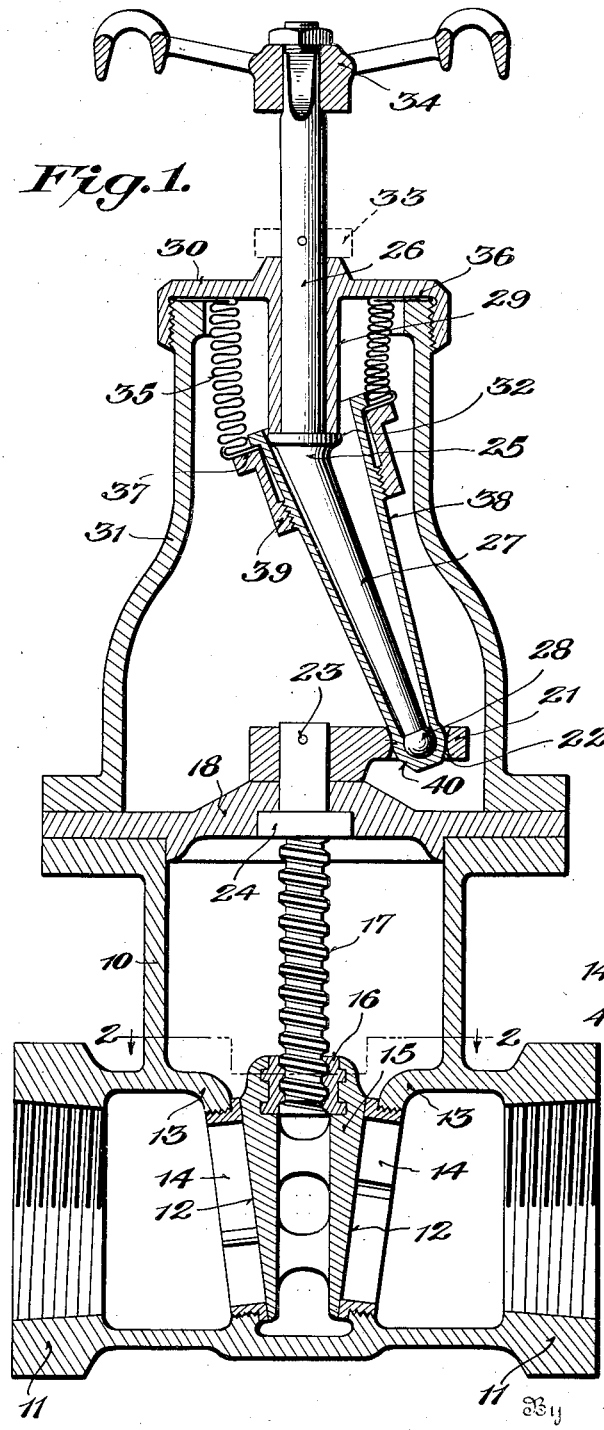
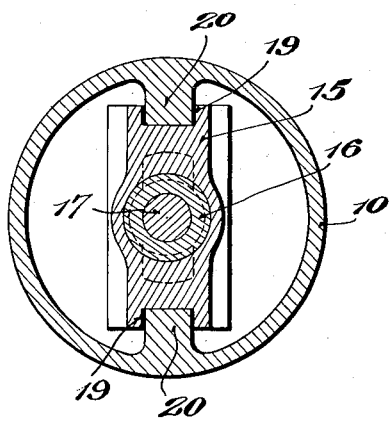
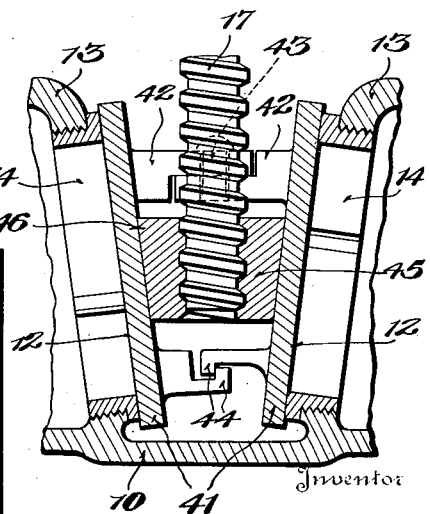

Patented Oct. 11, 1927.

1,644,825

UNITED STATES PATENT OFFICE.

WESTON M. FULTON, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

PACKLESS VALVE.

Application filed March 31, 1922. Serial No. 548,403.

This invention relates to valves of the type which employ a flexible fluid-tight partition in place of packing to prevent leakage between the valve-operating mechanism and the valve housing, and which are generally denominated "packless valves", and especially to means whereby gate valves may be made of the packless type.

Gate valves are especially adapted for service where it is desired that the valve member offer the least possible restriction to the flow of the fluid and, to this end, the valve member is ordinarily moved transversely of the axis of its seat until it entirely frees the opening through the latter. This requires a relatively extensive movement of the valve member, particularly where the valve is employed to control the flow of relatively large volumes of fluid. This extent of movement of the valve member renders it impracticable to interpose a flexible wall between the valve housing and a member of the valve operating train which has the same extent of movement as the valve itself because of the excessive flexure to which such a wall would be subjected in opening and closing the valve. The only suggestion heretofore made of overcoming this difficulty, of which I am aware, is to employ movement-multiplying mechanism in the operating train of the gate valve and to interpose a flexible wall between the valve housing and a valve operating member which has only a fraction of the movement of the valve member itself. This is the construction disclosed and claimed in my prior application, Serial No. 523,410, filed December 19, 1921, wherein the valve member is caused to swing laterally of the axis of its seat into and out of operative position.

It is an object of this invention to provide a gate valve wherein the valve member has rectilinear movement into and out of engagement with its seat with operating mechanism whereby a flexible wall may be interposed between a member of the valve-operating train and the valve housing without excessive flexure of said wall.

Another object of this invention is to provide a gate valve of the type in which the valve member is positively forced into and out of intimate engagement with its seat by cooperating threaded members with a flexible wall forming a fluid tight partition between the valve-operating train and the valve housing.

Another object of this invention is to provide valve-operating means including a rotatable crank-like member with a substantially stationary flexible fluid-tight partition between said member and the valve housing but which will flex in response to the revolution of the laterally displaced or deflected end of said crank-like member.

Another object of this invention is to provide a valve with simple and rugged valve-operating mechanism capable of exerting the power necessary to force the valve member into engagement with its seat and relieve said member therefrom and also capable of moving said valve member through a range of movement sufficient to entirely free said member from its seat in combination with a flexible fluid-tight wall between the valve-operating mechanism and the valve housing.

Other objects will appear as the description of the invention proceeds.

Stated generally, the preferred embodiment of the invention comprises, in combination with a valve member and its housing, operating mechanism for said valve member including a rotatable member and a flexible fluid-tight member forming a partition or connection between said rotatable member and said housing, said operating member comprising a laterally deflected or crank-like stem housed within said flexible member and operating by the revolution of its laterally displaced or deflected end to rotate one of two cooperating threaded members the other of which is connected to said valve member, said flexible member having an end member which embraces the laterally deflected portion of said crank-like member and is substantially coextensive therewith and which is gyrated by said crank-like member as it revolves, and said flexible member being substantially stationary but contorted by the gyrations of said end member.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same characters of reference are employed to designate corresponding parts in the several figures:—

Fig. 1 is a vertical axial section of a gate valve embodying the present invention;

Fig. 2 is a transverse section on the line 2—2 of Fig. 1; and

Fig. 3 is a fragmentary axial section illustrating an embodiment of the present invention in which the valve member includes relatively movable valve disks.

In the form shown in Figs. 1 and 2, the valve housing 10, of any suitable character, is provided with any appropriate inlet and outlet connections 11 and has interiorly thereof a valve seat of any suitable construction, shown as composed of opposed relatively-inclined seats 12 which may be formed together with the ports as a part of the interior partitions 13 or which, as illustrated, may be formed as threaded annular members 14 received in threaded apertures in said partitions 13 with the openings therethrough constituting the valve ports. Cooperating with said valve seat is a valve member 15 of any suitable construction, but preferably of wedge-shaped formation, with its opposite faces inclined in conformity with the inclination of the valve seats 12, so that said valve member may be wedged into intimate engagement with said valve seat.

Said valve member 15 is provided with means for moving said member into and out of engagement with its seat and, in order to exert the requisite power to force the valve member into wedging engagement with its seat and to release the same therefrom, said valve-operating means preferably comprises cooperating threaded members. Said threaded members may be of any suitable construction, being shown as composed of an interiorly threaded nut 16 integrally formed with or suitably retained on the valve member 15 and cooperating with an exteriorly threaded stem 17 rotatably mounted in the brace or partition 18. To prevent transmission of the rotation of the threaded stem 17 to the valve member 15, the latter is preferably provided with a groove or slot 19 on one or both of its end faces to receive a key-like rib or projection 20 which may be formed integrally with or suitably connected to the wall of the valve housing 10. The ribs 20 by their cooperation with the grooves 19 also operate to guide the valve member 15 in its movement into and out of engagement with its seat.

To rotate the threaded stem 17, the end of said stem projecting through the brace 18 is provided in any suitable way with a crank-like or lateral extension 21 apertured at 22 for engagement with a rotatable operating member, said lateral extension 21 being suitably secured to the projecting end of the stem 17, as by a pin 23. Axial displacement of the stem 17 is prevented by a collar 24 on said stem engaging the lower side of the brace 18 and the crank-like extension 21 engaging the upper side of said brace.

Rotation of the crank-like extension 21 is effected by a rotatable operating member in the form of a crank-like stem 25 having a portion 26 in axial alignment with the threaded stem 17 and a laterally deflected or displaced portion 27 the free end 28 of which describes a circular orbit around the coincident axes of the stem 17 and the portion 26 of said crank-like member. Said member 25 is mounted for rotation in any suitable way, being shown as journalled in a sleeve-like extension 29 on the cap 30 which is threaded onto the bonnet 31 of the valve housing. The crank-like member 25 is also provided with a collar 32 for engagement with the inner end of the sleeve 29 to prevent axial outward movement of said crank-like member and, if desired, a second collar 33 may be suitably secured to the outwardly extending end of said crank-like member for coaction with the outer face of the cap 30 to prevent axial inward movement of said crank-like member 25—although the latter is unnecessary as the resiliency of the flexible partition wall to be described will normally maintain the collar 32 in engagement with the end of the sleeve 29. The outer end of the crank-like member 25 is provided with an operating or hand grasp member 34 of any suitable construction and secured thereto in any suitable way.

Interposed between the crank-like member 25 and the wall of the valve housing is a flexible member affording a fluid-tight connection or partition between said member and said housing. While said flexible member may be of any suitable construction, it is preferably formed as a corrugated, expansible and contractable, tubular metal wall 35 having a flange 36 by which it may be clamped, to constitute a fluid-tight connection, between the cap 30 and the end of the bonnet 31 and a flange 37 by which it may be clamped, to constitute a fluid-tight connection, between flanges on an end wall or member 38 and an exterior sleeve 39 threaded onto said end wall or member 38. In the form shown, said end wall or member 38 is of generally tubular formation, embraces and is of substantially the same length as the length of the laterally extending or deflected end 27 of the crank-like stem 25, and is closed at its free end where it is preferably given a generally spherical exterior surface 40 for cooperation with the spherically-shaped wall of the aperture 22 in the crank-like extension 21. The interior surface of said member 38 at said free end is also made spherical for cooperation with the spherical end 28 of the crank-like member 25.

In operation, the valve member 15 is opened and closed by rotation of the crank-like member 25 in the journal afforded by the sleeve 29 on the cap 30. During rotation of said member 25 its portion 26 rotates about an axis coincident with the axis of the threaded stem 17, but the laterally deflected or displaced end 27 of said member 25 revolves about said axis and the free end 28 of said portion 27 describes a circular orbit about said axis as a center. During the revolution of the laterally deflected or displaced end 27 of the crank-like member 25 the end wall or member 38 of the flexible partition wall is caused to gyrate with the orbital movement of said laterally deflected or displaced end 27, but the rotation of said crank-like member is not transmitted to said end member 38 owing to the freedom of movement between the spherical end 28 of said crank-like member and the coacting interior spherical surface of the end member 38. This gyratory movement of the end member 38 causes the flexible tubular wall 35 to be continually flexed by distortion of the corrugations at opposite sides thereof but without tending to rotate said flexible wall. This flexure of the corrugated tubular wall manifests itself as a contraction of the corrugations on the side toward which the portion 27 of the crank-like member 25 is directed at any instant and an expansion of the corrugations on the diametrically opposite side of said wall, the end of the tubular corrugated wall always lying at an angle to the axis of said wall and describing the zone of a sphere as said wall is flexed progressively by the gyratory movement of the end member 38.

The gyratory movement of the end member 38 under the action of the deflected end 27 of the crank-like member 25 transmits the orbital movement of the free end 28 of said crank-like member to the crank-like extension 21 on the threaded stem 17, the spherical surfaces of engagement 40 and 22 between said end member 38 and said crank-like extension preventing binding of said end member in the aperture of said crank-like extension. Rotation of the stem 17, owing to the coaction of the threads on said stem with the threads in the nut 16 on the valve member 15 causes said member to move outwardly or inwardly with respect to its valve seat, depending upon the direction of rotation of said stem 17. During this movement of the valve member 15 it is guided and its rotation prevented by the engagement of the key-like ribs 20 on the valve housing with the grooves or slots 19 in the sides of said valve member.

In place of a valve member composed of a single wedge-like element as shown in Fig. 1, said valve member may be composed of separable disks 41, as shown in Fig. 3, said valve disks being of any suitable construction and connected into a unit in any suitable way. The valve member illustrated in Fig. 3 is similar to that disclosed in my prior application above identified, the disks 41 being provided with inwardly directed over-lapping lugs 42 held in cooperative relation by loosely fitting pins 43 and with inward-directed interengaging hook-like lugs 44 to retain the disks in approximately operative relation. In this construction the nut 45 has limited axial movement with respect to the valve disks and has its opposite sides 46 inclined to wedge said disks into intimate engagement with the opposed valve seats 12. Rotation of the nut 45 with respect to the valve member is prevented in any suitable way, as by the engagement of key-like ribs 20 on the valve housing in slots or grooves 19 in the lateral faces of the nut. Withdrawal of the valve member from its valve seat is effected by the engagement of the nut 45 with the cooperating lugs 42.

The operation of a gate valve with the valve member constructed as shown in Fig. 3 is the same as that heretofore described except that during the initial rotation of the stem 17 to open the valve, the nut 45 moves outwardly with respect to the valve disks 41, relieving said disks from engagement with their seats, until said nut engages the lugs 42, whereupon said valve member is moved out of alignment with its seat as a unit. Conversely, when the stem 17 is rotated to move the valve member into engagement with its seat continued rotation of said stem causes the nut 45 to move inwardly with respect to the valve disks 41, wedging said disks into intimate engagement with their seats and compensating for any lack of alignment between said valve disks and seats.

It will therefore be perceived that a gate valve has been provided wherein the valve member is moved rectilineally into and out of engagement with its seat, while, at the same time, a flexible wall has been interposed between the valve operating train and the valve housing to form a fluid-tight connection or partition therebetween. At the same time, the valve member may be moved axially to any desired extent to entirely free the valve member from its seat without the flexible wall being subjected to excessive flexure. Moreover, a packless valve has been provided wherein the valve member may be moved into and out of operative position by the coaction of threaded members so that the requisite power can be exerted to force said valve member into intimate engagement with its seat and release said valve member therefrom. Also, a flexible but substantially stationary wall has been provided as a fluid-tight partition for a rotatable crank-like member of a valve-operating train. Therefore a very simple and rugged valve operating mechanism, particularly suited for gate valves, has been provided with a flexible fluid-tight partition without interfering with the freedom of movement of the valve member or the exertion of force required to move the same into and out of its operative position.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art while certain features thereof are capable of use with other features thereof and changes may be made in the details of construction, proportion and arrangement of parts without departing from the spirit of this invention.

While the invention has been illustrated as applied only to gate valves and has particular utility when used in conjunction therewith, it is capable of application to other valves and possesses marked utility wherever relatively large valve movement is to be obtained by the coaction of cooperating threaded members. Reference is therefore to be had to the claims hereto appended for a definition of the limits of the invention.

What is claimed is:—

1. In a gate valve, the combination of a valve housing having a valve seat therein, a valve member in said housing movable transversely of the axis of said seat, cooperating threaded members for moving said valve member, means for producing relative rotation between said threaded members including a crank-like member on one of said threaded members, a rotatable stem having a portion deflected at an acute angle thereto and adapted to co-operate with said crank-like member, a rigid tubular member embracing the deflected portion of said stem, and a flexible tubular wall constituting a fluid-tight partition between said tubular member and said valve housing, the plane of the end of said flexible wall intersecting the axis of said stem within the non-deflected portion thereof.

2. In a gate valve, the combination of a valve housing having a valve seat therein, a valve member in said housing movable transversely of the axis of said seat, cooperating threaded members for moving said valve member, means for producing relative rotation between said threaded members including a crank-like member connected to one of said threaded members, a rotatable stem coaxial with said threaded member and having a portion deflected at an acute angle thereto, said deflected portion cooperating with said crank-like member, a flexible tubular wall forming a fluid-tight joint with said valve housing and disposed concentrically with said stem, said flexible tubular wall terminating at a plane which intersects said stem within the non-deflected portion thereof, and a rigid tubular member connected to said flexible wall and enclosing the deflected portion of said stem to form with said flexible wall a fluid-tight housing therefor.

3. In a gate valve, the combination of a valve housing having a valve seat therein, a valve member in said housing movable transversely of the axis of said seat, cooperating threaded members for moving said valve member, means for producing relative rotation between said threaded members including a crank-like member connected to one of said threaded members, a rotatable stem arranged co-axially with said threaded member and having a portion deflected at an acute angle thereto, said deflected portion cooperating with said crank-like member, a flexible tubular wall forming a fluid-tight joint with said housing at one end, and a rigid tubular member substantially coextensive with the deflected portion of said stem and connected to the opposite end of said flexible wall and forming with said flexible wall a fluid-tight partition enclosing said stem, said flexible wall terminating in a plane which intersects said stem within the non-deflected portion thereof and said stem and tubular member and said tubular member and crank-like member having coacting spherical surfaces.

4. In a gate valve, the combination of a valve housing having a valve seat therein, a valve member in said housing movable transversely of the axis of said seat, cooperating threaded members for moving said valve member, means for producing relative rotation between said threaded members including a crank-like member connected with one of said threaded members, a rotatable stem coaxial with said threaded member and having a portion deflected at an acute angle thereto, a flexible tubular wall forming a fluid-tight joint with said housing, and a rigid tubular member forming a fluid-tight joint with the opposite end of said flexible wall, said flexible wall terminating in a plane which intersects said stem within the non-deflected portion thereof, said tubular member forming with said flexible wall a fluid-tight partition for said stem, and said stem cooperating with said tubular and crank-like members to effect an orbital movement of said tubular member, without rotating the same around its own axis, and a rotation of said crank-like member around its own axis.

5. In a gate valve, the combination of a valve housing having a valve seat therein, a valve member in said housing movable transversely of the axis of said seat, cooperating threaded members for moving said valve member, means for producing relative rotation between said threaded members including a crank arm on one of said threaded members, a rigid tubular member engaging said crank arm, a rotatable stem having a portion coaxial with said threaded members and a portion extending at an acute angle thereto and engaged in said tubular member to move said member in a circular orbit and thereby rotate said crank arm, and a flexible, corrugated, tubular wall forming with said tubular member a fluid-tight partition between said stem and said housing, said flexible wall terminating in a plane which intersects said stem within the portion of said stem which is coaxial with said threaded members and being contorted by said tubular member as it follows its orbital path.

6. In a gate valve, the combination of a valve housing having a valve seat therein, a valve member in said housing movable transversely of the axis of said seat, and means for moving said valve member including a rotatable stem coaxial with the axis of said crank and having a portion extending at an acute angle to said axis to form a crank-like member cooperating with said crank, and means for forming a fluid-tight partition enclosing said crank-like member, said means including a flexible tubular wall making a fluid-tight joint with said housing, and a rigid tubular member having one end interposed between said crank and said crank-like member and its opposite end making a fluid-tight joint with said flexible wall, said flexible wall terminating in a plane with intersects the portion of said stem which is coaxial with said crank.

In testimony whereof I have signed this specification.

WESTON M. FULTON.